United States Patent [19]
Edwards

[11] 3,967,518
[45] July 6, 1976

[54] CAMERA FILMSTRIP PROCESSOR CONTROLLED BY FILM MARKS

[75] Inventor: Gerald L. Edwards, Seattle, Wash.

[73] Assignee: CX Corporation, Seattle, Wash.

[22] Filed: Mar. 31, 1975

[21] Appl. No.: 563,296

[52] U.S. Cl. ................................. 83/210; 83/362; 83/365
[51] Int. Cl.² ...................... B26D 5/32; B26D 5/34
[58] Field of Search ............. 83/210, 209, 211, 362, 83/71, 72, 365; 250/219 R

[56] References Cited
UNITED STATES PATENTS

| | | | |
|---|---|---|---|
| 3,465,624 | 9/1969 | Becker | 83/210 X |
| 3,469,480 | 9/1969 | Nassenstein et al. | 83/365 X |
| 3,559,519 | 2/1971 | Westphal | 83/210 |
| 3,760,667 | 9/1973 | Maxey et al. | 83/362 X |
| 3,796,117 | 3/1974 | Mukai et al. | 83/210 |
| 3,822,624 | 7/1974 | Shoji et al. | 83/210 X |

*Primary Examiner*—Frank T. Yost
*Attorney, Agent, or Firm*—Christensen, O'Connor, Garrison & Havelka

[57] ABSTRACT

Processing apparatus for automatically cutting (or otherwise operating on) a filmstrip during advancement thereof into positions precisely related to the cutter by referencing to the transversely oriented center lines, rather than leading or trailing edges, of marks or cuts longitudinally spaced along an edge of the filmstrip. Sensor means having a mark detector and responsive to duration of a first time interval initiated by the mark's leading edge passing the sensing detector and terminated by the mark's trailing edge passing the detector, computes the correct filmstrip feed distance from the true center line of each mark to the associated next stopping point wherein the filmstrip is presented to the cutter. It does so by counting the pulses controlling filmstrip feed rate established by a stepping motor drive, after first dividing the pulse frequency in half during only said first time interval, such count continuing to a preset number selected to be reached after said first time interval.

7 Claims, 4 Drawing Figures

CAMERA FILMSTRIP PROCESSOR CONTROLLED BY FILM MARKS

BACKGROUND OF THE INVENTION

This invention relates to photographic filmstrip processing equipment and the like wherein an advancing filmstrip has been notched at intervals along an edge or has been provided with other interval markings for the purpose of controlling operation of a cutter or other processing device in precise relation to successive advancements of the filmstrip. The invention is herein illustratively described by reference to its presently preferred form and application; however, it will be recognized that certain modifications and changes therein with respect to details may be made without departing from the essential features involved.

Commercially used filmstrip edge notching equipment is reliably precise in positioning the notches correctly in relation to the intended cutting lines or other points of reference along the filmstrip. However, a considerably lesser degree of precision is encountered in sensing and utilizing those notches for controlling the cutter or other operating mechanism accurately as a function of filmstrip position. This difficulty is due to primarily two interrelated factors: (1) imprecision in aligning the longitudinal edges of successive customer lengths of filmstrip spliced together end to end to be wound cumulatively upon the feed reel, and (2) tolerance or free play allowed in the filmstrip feeding and guiding mechanism to accommodate such misalignments. For both of these reasons the notch edge sensing device employed in the mechanism may be caused to trigger operation of the cutter or other means with incorrect timing. This may be seen from the fact that the notches or other locating elements cut in the filmstrip taper or otherwise vary in width transversely of the filmstrip. Thus, filmstrip feed travel distance between the center line of the notch (transverse to the filmstrip) and its trailing and/or leading edges (passage of which is sensed by the sensor device) can vary. Thus, if the filmstrip shifts transversely in one direction relative to the tracking point of the sensor device, the latter produces a notch leading edge signal earlier in relation to filmstrip position than if the lateral shift occurs in the opposite sense.

The present invention deals with the foregoing and similar or related problems by so processing the sensed notch edge signals that timing of the resultant trigger pulse for the cutter or other operating device is reliably accurate in relation to notch center line independently of filmstrip splicing misalignments or transerse shifting in the processing equipment.

A further objective hereof is to devise a means to that end which will operate compatibly and with digital accuracy in conjunction with a stepping motor filmstrip feed and associated pulse operated devices in a composite commercial camera filmstrip processor.

Another object is to provide a relatively simple and inexpensive yet highly reliable means by which to initiate or otherwise control the positionally related functioning of apparatus or of a process step on the basis of the imaginary center line of a notch or other indexing cut or mark formed symmetrically about that center line.

BRIEF DESCRIPTION OF INVENTION

As herein disclosed, the invention is applied to the sensing of edge notch center lines in the process of operating a filmstrip cutter as a precise function of advancing filmstrip position. Sensor means having a notch detector initiates a first time interval in response to a notch leading edge passing the detector and terminates such first time interval by the mark's lagging edge passing the detector. Timing pulses, preferably those utilized to operate a stepping motor which advances the filmstrip, are divided in frequency by a factor of two during the first time interval and applied to a pulse counter. The counter receives the half-frequency pulses during such first time interval and full frequency pulses immediately thereafter. When a predetermined count is tallied in the counter, the cutter is actuated, either immediately thereupon or at a fixed time interval thereafter, depending upon positioning of the notch detector in relation to the cutter station and also upon positioning of the notch along the filmstrip in relation to the desired cutting line.

In some instances the notch may be more advanced in relation to the intended cutting line than in other instances. To accommodate such differences, a fixed time interval or delay in the sensor means may be selectively varied.

By operating the counter at half frequency during the first time interval corrresponding to the width of the notch at the point or line on filmstrip being tracked by the notch detector, and thereafter at full frequency to a predetermined limiting count, the system automatically accounts for variations in notch width at the transverse tracking point or line due to notch taper, so as to operate the cutter in precise timed relation to the notch center line as desired.

These and other features, objects and advantages of the invention will become more fully evident from the following description by reference to the accompanying drawings.

DESCRIPTION OF PREFERRED EMBODIMENT IN REFERENCE TO DRAWINGS

Figure 1:
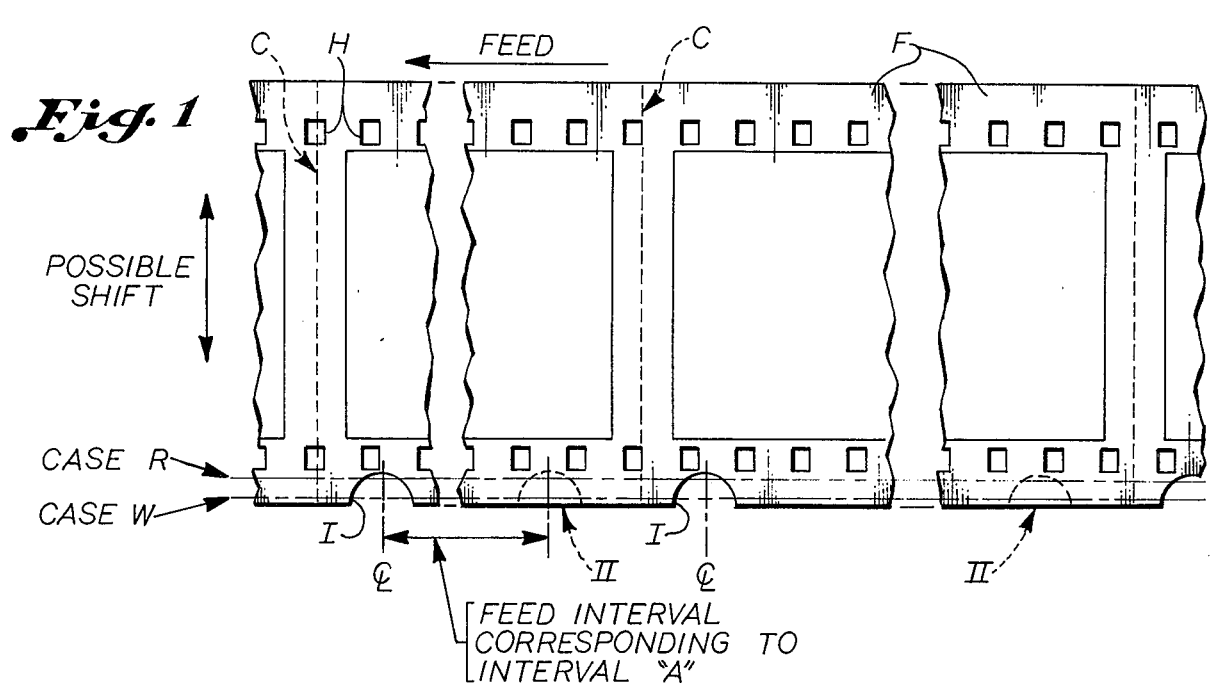
FIG. 1 is a face view of a length segment of camera filmstrip notched at one edge to control cutting along lines C, the view illustrating a first set of notches I in one relative group position relative to the desired cutting lines, and a second, alternative set of notches II, at an alternate relative group position relative to such cutting lines.

In FIG. 1, the filmstrip F may for example be 35mm camera filmstrip having sprocket holes H at regular intervals along opposite edges. In the processing of such filmstrip in a commercial laboratory, it is typically desirable to sever the filmstrip at every fourth frame for convenience in packaging the segments for delivery to the customer after the exposures have been printed. In preparing to run the filmstrip through the processor for purposes of printing the exposures, cutting the filmstrip and subsequently packaging the filmstrip with the prints, the individual lengths of filmstrip delivered to the laboratory by the customer are first spliced end to end and wound up on a large supply reel in a continuous filmstrip. The filmstrip is then fed progressively from the reel through the processing apparatus, being driven typically by a pulsed stepping motor. In conventional equipment, the stepping motor drive advances the filmstrip by one inch for every 64 motor energizing pulses. When the filmstrip is to be cut, the stepping motor is stopped, the cutter is actuated, and the motor is restarted for running the filmstrip to the next cutting point.

In order to control the stopping point of the filmstrip precisely and thereby produce the cut at the exact desired location between exposure frames without risking cutting through an exposure itself, it is important to provide sensing means that will respond to the precise center line of each of the control notches, such as notches I, alternatively differently located notches II, in FIG. 1. While two sets of notches have been shown in FIG. 1, it will be understood that only one control set will ordinarily be present along the control edge. FIG. 1 shows that the notch phasing, i.e., degree of lag or lead, in relation to the desired cutting lines may differ from filmstrip to filmstrip depending upon the system of notching being used so as to require a compensating delay in the system controlling cutter operation.

Figure 2:
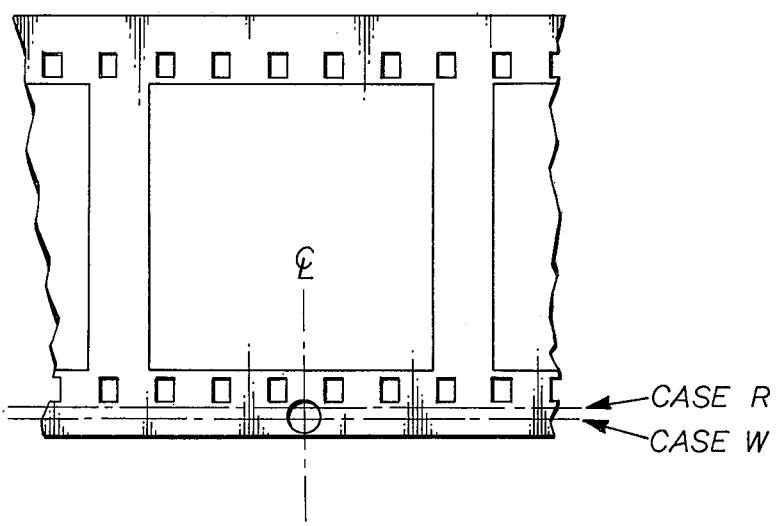
FIG. 2 is a face view of a length section of camera filmstrip having a circular mark instead of a notch.

While notching equipment is precise and will locate the notch center lines LC in the correct positional relationship to the desired cutting lines C lengthwise of the filmstrip there are other problems in utilizing these notches for precision control of the cutter. One of these problems arises from the fact that the splicing of filmstrip lengths end to end is difficult to do in such a way that the filmstrip length edges are precisely aligned. Consequently, the apparent width of a notch passing a stationary notch detector may be greater for one section of filmstrip than for the succeeding section because of the notch taper. The same is true due to transverse shifting of the filmstrip in the guide means used. This may be seen in FIG. 1 from the detector tracking lines designated case R and case W, respectively. If the point of tracking by the detector transversely of the filmstrip F lies along the line designated case R, the notches will appear narrow to the detector sensing means, whereas if the tracking line is that designated case W the notches will appear wide to the sensing means. If instead of a notch, a circular hole is punched in the filmstrip, the problem will be the same as depicted in FIG. 2 wherein a case R and a case W situation are also depicted.

Figure 3:
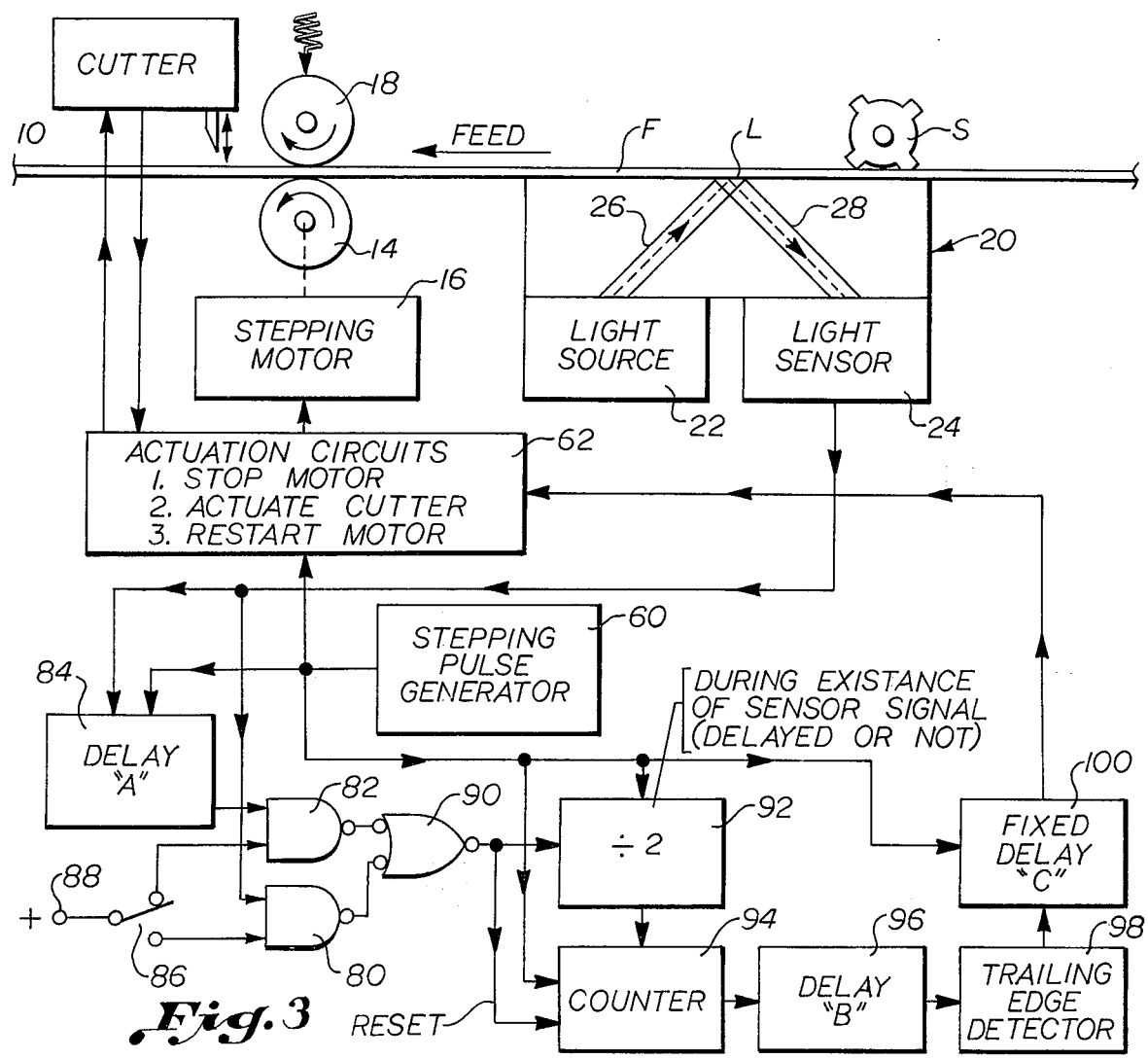
FIG. 3 is a block diagram of the preferred embodiment of the invention applied to operating a cutter.
Figure 4:
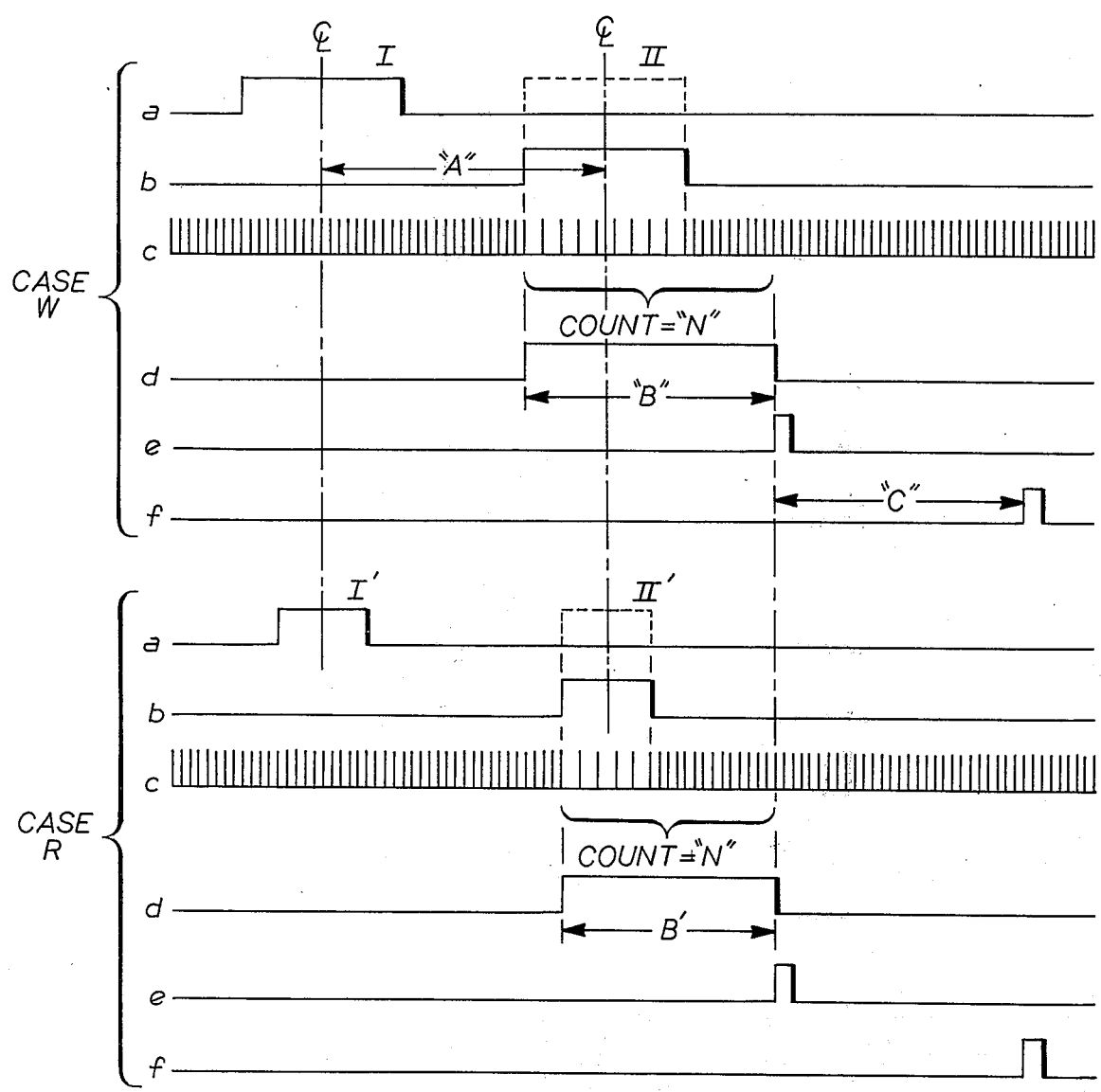
FIG. 4 is a timing diagram illustrating operation of the system shown in FIG. 3 for a first case "W" wherein the tracking line of the notch detector tracks near the base or wider portion of the tapered notch and thus produces a relatively wide first time interval, and a separate case "R" wherein the tracking is along a line near the apex of the tapered notch, producing a relatively narrow first time interval.

Referring to FIGS. 3 and 4, filmstrip F is shown being advanced by stepping motor 16. The latter drives a friction roller 14 against which the filmstrip is pressed under spring force by free-turning idler roller 18. This drive advances the filmstrip to the cutter 10.

The stepping motor is energized by pulses from a stepping pulse generator 60. Motor energization is under control of actuation circuits 62 which essentially comprise controlled switching means operable to start and stop the motor and also to actuate the cutter 10 in response to control signals from the sensing means about to be described.

The illustrated sensing means includes a notch detector 20 comprising a light source 22, a fiber optic light transmission array 26 directing light from the light source 22 to a spot L in the plane of the filmstrip, and a light sensor 24 which receives light reflected from the filmstrip through the fiber optic array 28 in accordance with conventional technology. The light sensor 24 is energized at one level or state by light reflected from the unnotched filmstrip surface areas and in a different state when light is not being reflected from the filmstrip during passage of the notch or other mark affecting light reflectance. Thus there is a change of state in the light sensor 24 each time a notch leading edge or notch lagging edge passes the tracking point L. Point L is at a precisely controlled distance from the location of the blade of cutter 10 along the film path. In FIG. 4, line a, the resultant change-of-state pulses corresponding to the notches I are depicted as a rectangular waveform or gate signal produced by the light sensor 24; also by dotted lines the corresponding waveform or gate signal produced at different phasing by the alternately positioned notches II depicted in FIG. 1. In FIG. 4, graph line a, in the "case W" group of wave diagrams, depicts a wide pulse I (or II) when a splicing discrepancy (or lateral filmstrip shift in the feed guide sprocket S) causes the notch to appear wide to the sensor whereas in graph line a of the "case R" situation, wherein the notch appears narrow, the pulse I' (or II') appears correspondingly narrow or of short duration. In each instance, however, it will be noted that the center point of the notch pulse I or I' or II or II' is the same on a time (or filmstrip travel) scale. Other pulse widths from the light sensor detector 24 may also occur depending upon splicing offsets or filmstrip shifts as previously mentioned.

The pulses from light sensor 24 subject to width variation are applied to each of two AND gates 80 and 82. The path of application to AND gate 82 is through a delay circuit 84 producing a delay interval A (FIG. 4). A selector switch 86 applies enabling voltage from a source not shown by alternatively connecting circuit point 88 to the control input of AND gate 82 or to that of AND gate 80. If gate 82 is energized, the square wave pulses from light sensor 24 are delayed by interval A before reaching the OR gate 90. This condition will satisfy the timing requirements for operating the cutter 10 in response to notches if at the station II location along the flimstrip. For notches in the station I location the selection switch 86 is reversed so there will be no delay encountered in applying the light sensor pulses to the OR gate 90. Delay circuit 84 is preferably controlled by pulses from the stepping pulse generator 60, which operates continuously, so that the interval A is measured in terms of filmstrip travel time rather than pure time, although the two are the same if filmstrip speed remains essentially constant.

The output of OR gate 90 represents, therefore, a gate pulse corresponding to notch width at the point L of tracking by the light sensor, and this gate pulse is applied to operate the divide-by-two frequency divider 92. The divider thus remains operative only during the notch width interval, the output of the frequency division circuit 92 being applied to the counter 94. Counter 94 receives pulses from stepping pulse generator 60 at full frequency immediately thereafter. The counter is reset at the commencement of the notch width interval pulse. At the time of reset or start of the count a delay circuit 96 producing a delay B is initiated. The delay interval B is terminated when the counter reaches a predetermined tally or count, whereupon the pulse or gate produced by circuit 96 terminates and its trailing edge is detected by the circuit 98 to initiate operation of the cutter 10 through a switching operation in the actuation circuits 62. Usually, because of the need for physical distance separating the detector scan point L and the cutter blade so as to accommodate the feed rollers 14, 18, for example, a further fixed delay is interposed by a circuit 100 producing a constant delay C representing the additional distance the filmstrip must travel before reaching the cutter 10, after production of the trailing edge detector pulse in circuit 98.

In operation assuming the case W condition shown in the upper portion of FIG. 4, the pulse I from light sensor 24 is delayed by interval A as shown in diagram line b. Counter 94 is started at the inception of the delay pulse appearing in graph line b so as to count the pulses at half-frequency for the duration of the notch width pulse and then at the full frequency of the generator pulses until the counter reaches a predetermined final count N, whereupon the counter stops counting, ending the timing pulse or gate B produced in the circuit 96. Pulse or gate B is shown in graph line d. The trailing edge of gate B is sensed by the detector 98 to produce the short pulse shown in graph line e whereas graph line f depicts the delayed pulse which operates the cutter through actuation circuits 62.

A similar operating sequence at offset phasing is shown by the graph lines a-f in the lower portion of FIG. 4, designated case R, representing the situation in which the notch width pulses are narrow. In this case the counter 94 reaches its full count N in a shorter time B' than it did in the case W situation. However, it will be seen that the terminal edge of gate interval B and that of interval B' always occurs at the same time point in terms of filmstrip position after the center line of delayed pulse I or I' (lines b in the two portions of FIG. 4). Consequently, the detected trailing edge pulses in graph lines e have the same relationship to filmstrip position (i.e., the desired cutting lines C) regardless of the apparent width of the notch being detected by the light sensor 24. Accordingly, the system automatically allows for or accommodates transverse shifting or misalignment of the filmstrip sections during process of feeding the filmstrip to the cutter 10 and always operates the cutter in precise relationship to the center lines of the notches.

In the preferred operation of the system, actuation circuits 62 are designed to maintain the stopped condition of the filmstrip drive at the cutting point corresponding to each filmstrip splice location. While not shown in the drawing, a manually actuated restart pushbutton associated with actuation circuits 62 is provided to enable operation of the system in that manner.

These and other features and aspects of the invention will be evident to those familiar with the art, based on an understanding of the foregoing description of the presently preferred embodiment.

What is claimed is:

1. Apparatus for processing an elongated filmstrip and the like at selected locations spaced lengthwise of the filmstrip during advancement thereof along a path extending past an operating device, wherein the filmstrip has control marks that are centered precisely at predetermined interval locations spaced along the length of the filmstrip but of varied width measured lengthwise of the filmstrip, said apparatus comprising sensor means having a mark detector at a station spaced a predetermined distance from said operating device lengthwise of said path, and operable to sense passage of the respective leading and lagging edges of each mark as a point along each such edge passes said station, said sensor means being thereby operable to measure a first advancement interval corresponding to the width of each mark between the sensed edge points thereof passing such station, said sensor means being operable to time actuation of the operating device after advancement of the filmstrip following one such edge point passing said mark detector by a distance corresponding to half said first interval added to a predetermined second interval, thereby resulting in actuation of the operating device each time the filmstrip advances by a fixed distance in relation to the mark detector independently of differences that may occur from one mark to the next in their respective measured mark width intervals.

2. The apparatus defined in claim 1, wherein the sensor means comprises a source of recurrent pulses, means for counting said pulses during said first time interval and during the period of time immediately following said first time interval to the end of the second time interval, means for dividing the pulse frequency by two during the first time interval, and means responsive to a predetermined count of said counter means for timing actuation of the operating device thereafter.

3. The apparatus defined in claim 2, wherein the marks on the filmstrip comprise tapered notches formed in the filmstrip along a longitudinal edge of the filmstrip, and wherein the edge is subject to transverse positional variatons during advancement of the filmstrip through the apparatus.

4. The apparatus defined in claim 3, further comprising a stepping motor, and wherein the pulses from said source are utilized to operate the stepping motor, thereby to interrelate advancement rate of the filmstrip to duration of the first and second time intervals.

5. The apparatus defined in claim 4, wherein the operating device comprises a filmstrip cutter.

6. The apparatus defined in claim 1, wherein the operating device comprises a filmstrip cutter.

7. The apparatus defined in claim 1, including means selectively operable to interpose a fixed additional delay in actuation of the operating device, corresponding to a different relative phase position of the marks along the filmstrip in relation to the selected respective processing locations thereon.

* * * * *